W. J. EVANS.
UNIVERSAL JOINT.
APPLICATION FILED MAY 16, 1913.
1,172,964.
Patented Feb. 22, 1916.
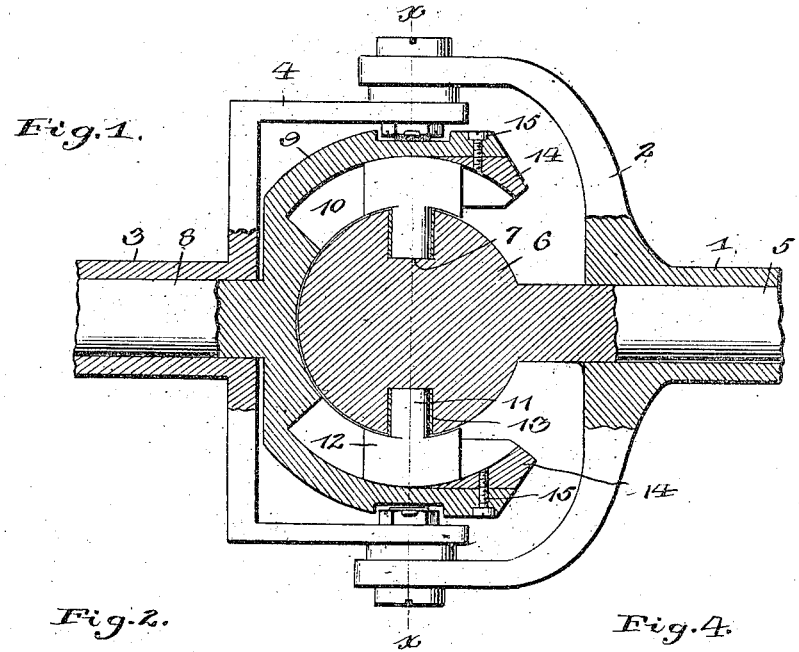
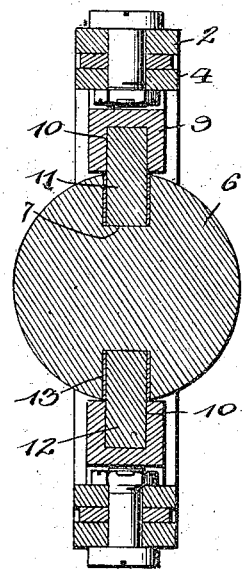
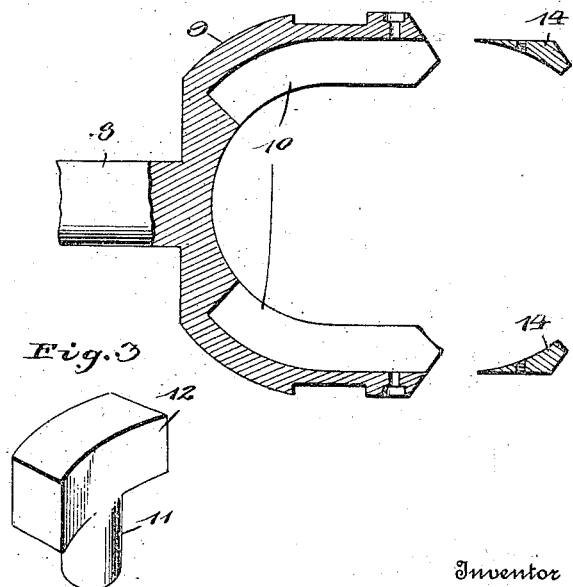
Witnesses
Inventor
W. J. Evans,
By Victor J. Evans
Attorney

UNITED STATES PATENT OFFICE.

WILLIAM J. EVANS, OF LINNBURG, IOWA.

UNIVERSAL JOINT.

1,172,964.     Specification of Letters Patent.     Patented Feb. 22, 1916.

Application filed May 16, 1913. Serial No. 768,134.

*To all whom it may concern:*

Be it known that I, WILLIAM J. EVANS, a citizen of the United States, residing at Linnburg, in the county of Webster and State of Iowa, have invented new and useful Improvements in Universal Joints, of which the following is a specification.

The invention relates to a four wheel drive for vehicles, such as automobiles, and deals directly with the means whereby the driving power is applied to the steering wheels at all stages of adjustment within the range of movement of such wheels.

The invention provides novel connecting means between the drive shaft and spindle which admits of replacement being easily effected when necessary so that lost motion or play may be prevented by substituting new parts for such parts as have become worn.

The invention also provides novel connecting means between the axle and the axle arm for the purpose of insuring a strong and durable joint, which will sustain the strain imposed thereon when the machine or vehicle is in service.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a central longitudinal section of the end portion of an axle and parts associated therewith embodying the invention. Fig. 2 is a section on the line $x$—$x$ of Fig. 1. Fig. 3 is a detail view of one of the lugs forming connecting means between the ball terminal of the drive shaft and the socket of the spindle. Fig. 4 is a sectional view of the spindle and socket, showing the closing pieces for the outer end of one of the grooves removed.

Corresponding and like parts are referred to in the following description, and indicated in all the views of the drawing, by the same reference characters.

The axle 1 is hollow and provided at each end with a fork 2. The axle arm 3 is likewise hollow and is formed at its inner end with a cup or box 4, which is received between the members of the fork 2 and pivotally connected at opposite points to the members thereof. The fork 2 is arranged vertically so that the axle arm 3 may move in a horizontal plane about the pivot connection of such axle arm with the fork of the axle. A drive shaft 5 is mounted in the axle 1 and is provided at its outer end with a ball 6 in which at diametrically opposite points are formed openings 7. A spindle 8 is mounted in the axle arm 3 and is provided at its inner end with a socket 9 of approximately spheroidal shape and provided upon its inner side at diametrically opposite points with grooves 10. The socket 9 is mounted in the cup or box 4. The wheel, not shown, is adapted to be supported upon the axle arm 3 and is secured to the spindle 8 in any manner so as to rotate therewith. Two lugs form connecting means between the ball terminal 6 and the socket 9, each of said lugs comprising a journal 11 and a head 12, the journal 11 being fitted in one of the openings 7 and the head 12 fitting in one of the grooves 10. The journal 11 is made rounding, whereas the head 12 is oblong with its outer and inner walls curved to conform to the curvature of the grooves 10 and ball 6. A sleeve 13 is fitted to each of the journals 11 and may be of phosphor-bronze or like metal, said sleeve being replaceable when worn, thereby admitting of a close fit being maintained between the journal portions of the lugs and the openings of the ball terminal 6. The socket 9 is of an internal diameter corresponding with the diameter of the ball terminal 6 so as to insure a close fit. The grooves 10 curve in their length to admit of power being transmitted from the shaft 5 to the spindle 8 at any angular position of the axle arm 3 when the latter is turned with reference to the axle. The head portions 12 of the lugs play in the grooves 10 when power is transmitted from the shaft 5 to the spindle 8 when the latter occupies an angular position with reference to the drive shaft. A block 14 closes the outer end of one of the grooves 10 and when in position is made secure by means of a screw or fastening 15. When the block or closing piece 14 is removed the parts may be easily assembled or disconnected and after the ball with the lugs in place has been received in the socket the block or closing piece 14 is placed in position, thereby retaining the parts in place.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a device of the class described a pair of elements, one of said elements having a ball at one end, said ball being provided at diametrically opposite points with openings, and the other element having a socket to receive the ball, said socket being provided at opposite ends with curved grooves, connecting members between the ball and socket, the same comprising journals to enter the openings of the ball and blocks to operate in the grooves and the said blocks being curved to conform to the groove and ball, means detachably connected with the free terminal of the groove for closing the outer ends of the latter to prevent accidental slipping of the blocks therefrom and permitting of the assemblage or removal of said ball and connecting members between the ball and socket, and a detachable metallic sleeve embracing and fitted to each journal and adjusted to fit within the diametrically operated openings of the ball and engage with the walls thereof, whereby establishing a close fit between the journals and openings of the ball.

In testimony whereof I affix my signature in presence of two witnesses.

WILLIAM J. EVANS.

Witnesses:
E. M. LUNDIEN,
L. J. BJORK.